United States Patent [19]

Buchanan et al.

[11] Patent Number: 5,229,091
[45] Date of Patent: Jul. 20, 1993

[54] PROCESS FOR DESULFURIZING CLAUS TAIL-GAS

[75] Inventors: J. Scott Buchanan, Mercerville, N.J.; David L. Stern, Yardley, Pa.; Joseph F. Sodomin, Centreville; Gerald J. Teman, Vienna, both of Va.

[73] Assignee: Mobil Oil Corporation, Fairfax, Va.

[21] Appl. No.: 868,432

[22] Filed: Apr. 15, 1992

[51] Int. Cl.$^5$ .......................... B01J 8/00; C01B 17/00
[52] U.S. Cl. ............................ 423/244.01; 423/574 R
[58] Field of Search ........... 423/242 A, 242 R, 244 R, 423/244 A, 574

[56] References Cited

U.S. PATENT DOCUMENTS

| | | | |
|---|---|---|---|
| 3,764,665 | 10/1973 | Groenendaal et al. | 423/574 |
| 3,821,110 | 6/1974 | Luetzelschwab | 423/242 |
| 4,692,318 | 9/1987 | Tolpin et al. | 423/239 |
| 4,855,117 | 8/1989 | Deschamps et al. | 423/244 |
| 4,857,297 | 8/1989 | Kettner et al. | 423/576.8 |

Primary Examiner—Gregory A. Heller
Attorney, Agent, or Firm—A. J. McKillop; G. W. Hager; C. A. Malone

[57] ABSTRACT

A process is disclosed for removing sulfur from tail-gas emitted from a Claus sulfur recovery process. First, the tail-gas is oxidized so as to convert sulfur therein to sulfur oxides. Oxidized tail-gas is directed into an absorber where a solid absorbent absorbs substantially all the sulfur oxides thereon. After allowing sufficient time for a desired amount of sulfur oxides to be absorbed, absorption is ceased. Next, the solid absorbent containing the absorbed sulfur oxides is contacted with a reducing gas so as to release an off gas containing hydrogen sulfide and sulfur dioxide. Upon releasing sulfur from the solid absorbent, the solid absorbent is regenerated and redirected into the absorber. Sulfur in the off gas emitted by regeneration is concentrated to an extent sufficient for use within a Claus sulfur recovery process for conversion to elemental sulfur. By combining this process with a Claus sulfur recovery process, sulfur dioxide emissions can be reduced to less than about two parts per million.

31 Claims, 2 Drawing Sheets

PROCESS FOR DESULFURIZING CLAUS TAIL-GAS

FIELD OF THE INVENTION

This invention relates to a process for extracting sulfur from a gas containing hydrogen sulfide and sulfur oxides. The invention is particularly adapted for desulfurizing exhaust gas from a Claus unit. The process also works on other sulfur-containing gas streams, e.g., light, saturated hydrocarbons, hydrogen or carbon monoxide gas streams containing $H_2S$ and/or sulfur oxides.

BACKGROUND OF THE INVENTION

In the Claus process, elemental sulfur is produced by reacting $H_2S$ and $SO_2$ in the presence of a catalyst. The Claus system uses a combustion chamber which, at 950°–1,350° C., converts 50 to 70% of sulfur contained in the feed gas into elemental sulfur. Sulfur is condensed by cooling the reaction gas to a temperature below the dew point of sulfur, after which the remaining gas is heated and further reacted over a catalyst. Normally, the gas passes through at least two such Claus catalyst stages.

The different stages of the process may be represented by the following equations:

$$H_2S + 3/2 O_2 \rightarrow SO_2 + H_2O \qquad (I)$$

$$2H_2S + SO_2 \rightarrow 3S_n + 2H_2O \qquad (II)$$

The overall reaction is:

$$3H_2S + 3O_2 \rightarrow 3S_n + 3S_n + 3H_2O \qquad (III)$$

Below 500° C., the symbol n has a value of approximately 8.

The final Claus exhaust gas still contains small amounts of $H_2S$, $SO_2$, $CS_2$, carbon oxysulfide, CO, and elemental sulfur in the form of a vapor or mist. The exhaust gas can be subjected to post-combustion to convert substantially all sulfur species to sulfur oxides ($SO_2$ and $SO_3$), which are then emitted into the atmosphere.

Sulfur emitted as sulfur oxides ("$SO_x$") into the atmosphere with the exhaust gas may amount to 2–6% of the sulfur contained in the feed gas in the form of $H_2S$. In view of air pollution and the loss of sulfur involved, further purification is imperative.

Claus aftertreatments have been developed. These are carried out after the last Claus stage or after the post-combustion. These aftertreatments are, however, complicated and expensive or inadequate.

On aftertreatment, carried out before post-combustion, seeks to achieve by catalytic conversion as complete a reaction as possible between $H_2S$ and $SO_2$. The reaction temperature is lowered to below the condensation point of sulfur, whereby the reaction equilibrium corresponding to equation II is shifted to form sulfur. A distinction is made between dry processes using alternating reactors in which the catalyst is intermittently charged with sulfur and discharged, and processes where $H_2S$ and $SO_2$ react in a high-boiling catalyst-containing liquid to form elemental sulfur which is drawn off continuously as a liquid product.

Unfortunately, in these processes any deviation from the optimum $H_2S:SO_2$ ratio in the Claus exhaust gas results in a reduced sulfur yield. No appreciable conversion of sulfur compounds such as COS and $CS_2$ occurs. Sulfur recovery efficiency of Claus using this form of aftertreatment is limited to 98–99%. Cyclic operation, with alternating reactors, requires at least two reactors and much valves and piping.

A second aftertreatment catalytically hydrogenates $SO_2$ and S with $H_2$ and CO while COS and $CS_2$ are simultaneously hydrolyzed with $H_2O$ into $H_2S$ which can be treated conventionally.

Hydrogenation/hydrolysis does not require a stoichiometric $H_2S/SO_2$ ratio in the Claus exhaust gas. It almost completely converts COS and $CS_2$ so that sulfur yields of more than 99.8% can eventually be obtained. This process incurs high capital expenditures for elaborate apparatus. It also consumes substantial energy. Recycle of $H_2S$ reduces the Claus system capacity, while the production of waste water containing harmful constituents presents additional problems. In addition, the treatment (such as amine absorption) used to remove $H_2S$ is generally ineffective for removing unconverted COS and $CS_2$. Total emissions of reduced sulfur species are typically around 10 ppm by volume with this after treatment.

A third aftertreatment oxidizes all sulfur compounds into $SO_x$ which is then further processed. Thee processes are downstream of the post-combustion and therefore independent of the mode in which the Claus system is run. There are also dry processes, where $SO_2$ is adsorbed and returned to the Claus unit or processed to form sulfuric acid, and wet processes, where $SO_2$ is removed by absorptive scrubbing and further processed. For complete oxidation of COS and $CS_2$ and $CS_2$, the energy requirements are high and following the after-combustion, very large exhaust gas flows have to be treated.

The equilibrium conversion of the Claus reaction (equation II) may be improved by condensing out part of the water in the gas. The gas is then reheated and charged to another Claus stage to form elemental sulfur. This produces waste water which is highly corrosive due to the formation of thiosulfuric acid, polythionic acids and sulfurous acid. Processing of such waste water is expensive. Unavoidable formation of deposits of elemental sulfur also occurs during $H_2O$ condensation. Moreover, there is no conversion of COS and $CS_2$ so the maximum recovery of sulfur is about 98%. As a result of these disadvantages, this process has not been used on a commercial scale.

Where the aftertreatment involves conversion of all sulfur compounds into hydrogen sulfide, it is also known to oxidize part of said hydrogen sulfide with air into $SO_2$ or to convert part of the sulfur produced into sulfur dioxide and thereafter catalytically to convert the remaining hydrogen sulfide with sulfur dioxide at 125°–150° C. in fixed-bed reactors into sulfur. The sulfur loaded catalyst is regenerated by passing hot oxygen-free gases containing hydrogen sulfide through the catalyst. This avoids the disadvantages associated with the first type of aftertreatment, such as dependence on $H_2S/SO_2$ ratio and $COS/CS_2$ content in the Claus exhaust gas. Disadvantages of this process are the high capital cost and the higher $H_2S + SO_2$ input concentration for the low-temperature reactor caused by the admixture of a separately produced flow of $SO_2$. The maximum conversion overall efficiency obtainable with this process approaches 99%.

An aftertreatment process which oxidizes all sulfur compounds into $SO_2$ is exemplified by Groenendaal et al. in U.S. Pat. No. 3,764,665 which issued on Oct. 9, 1973. This patent disclosed a process for removing sulfur oxides from gas mixtures with a solid acceptor for sulfur oxides wherein the solid acceptor is regenerated with a steam-diluted reducing gas and the regeneration off-gas is fed to a Claus sulfur recovery process. The improvement comprises cooling the regeneration off-gas to condense the water vapor contained therein, contacting the cooled off-gas with a sulfur dioxide-selective liquid absorbent, passing the fat liquid absorbent to a buffer zone and then to a stripping zone wherein the absorbed $SO_2$ is recovered from the liquid absorbent and is supplied to the sulfur recovery process. By operating in this manner, fluctuations in the sulfur dioxide concentration of the regeneration off-gas were leveled-out and a relatively concentrated sulfur dioxide stream was supplied to the sulfur recovery process at a substantially constant rate.

Although this process supplies relatively concentrated sulfur dioxide to the sulfur recovery process at a substantially constant rate, the off-gas must be cooled and the fat liquid absorbent must be transferred to a buffer zone before the absorbed $SO_2$ can be stripped. Therefore, what is needed is a simpler process whereby these steps are eliminated and energy costs reduced.

SUMMARY

This invention is directed to a process for removing substantially low concentrations of sulfur from a gas stream. Via this process a solid absorbent is used to remove sulfur oxides when said absorbent is regenerated with a hydrocarbon or hydrogen reducing gas which produces an off-gas. This off-gas is passed to a Claus sulfur recovery process. Initially, an oxygen containing gas is introduced along with an exhaust or tail-gas into an incinerator under conditions sufficient to convert substantially all of the sulfur therein into sulfur oxides. Afterwards, the resultant gas with sulfur oxides therein is directed into an absorber where substantially all of the sulfur oxides are absorbed on a solid absorbent. The resultant gas is allowed to remain in the absorber for a time sufficient for a desired amount of sulfur oxides to be absorbed on the solid absorbent. Gases emitted from the absorber, which are substantially depleted of sulfur oxides, are released to the atmosphere. Gases released into the atmosphere contain less than about 2 ppm of sulfur oxides therein.

When sufficient sulfur oxides have been absorbed on the solid absorbent, absorption is ceased. Next, the solid absorbent is regenerated by contacting it with a hydrocarbon or hydrogen reducing gas under conditions sufficient to cause absorbed sulfur oxides to release thereby forming a sulfur dioxide/hydrogen sulfide off-gas and a regenerated solid absorbent. The sulfur dioxide/hydrogen sulfide, off-gas is released in a concentration sufficient to be removed or converted by a Claus sulfur recovery process. Thereafter, the off-gas is directed to a Claus sulfur recovery process where it is converted into elemental sulfur. Besides sulfur dioxide and hydrogen sulfide, the off-gas may contain water and unconverted reducing gas. It is preferrable to release sulfur during regeneration primarily in the form of $SO_2$, rather than $H_2S$, since the recycle of $SO_2$ to the front of the Claus plant will entail a lower air demand by the Claus plant. If $H_2S$ is fed to the Claus plant in the off-gas, then extra air would be needed, which would reduce the processing capacity of the Claus plant.

It is therefore an object of this invention to concentrate sulfur contained in an exhaust or tail-gas in amounts sufficient for removal by a Claus sulfur recovery process.

It is another object of this invention to improve the efficiency for the removal of sulfur compounds from an exhaust or tail-gas emitted from a Claus sulfur recovery process.

It is yet another object of this invention to protect the environment by lowering substantially the concentration of sulfur compounds emitted to the atmosphere.

It is a further object of this invention to provide for a dry bed absorbent process for use in reducing sulfur in an exhaust or tail-gas in combination with a Claus sulfur recovery unit to obtain substantially reduced total sulfur emissions of less than about 2 ppm.

It is a still yet further object of this invention to provide for a dry bed absorbent process for removing sulfur from an exhaust or tail-gas so as to eliminate waste disposal problems which are inherent in other processes.

It is a still even yet further object of this invention to provide for a dry bed absorbent process for the recovery of sulfur from an exhaust or tail-gas and thereby obtain carbon monoxide conversion due to the process' substantially high operation temperatures.

It is a yet still even further object of this invention to provide for a method which will convert substantially all of the sulfur compounds in a tail-gas or exhaust gas to sulfur dioxide so as to reduce the oxygen demand upon oxidation of said stream which effectively increases the treating capacity of a Claus sulfur recovery plant.

DESCRIPTION OF THE PREFERRED EMBODIMENTS

Figure 1:
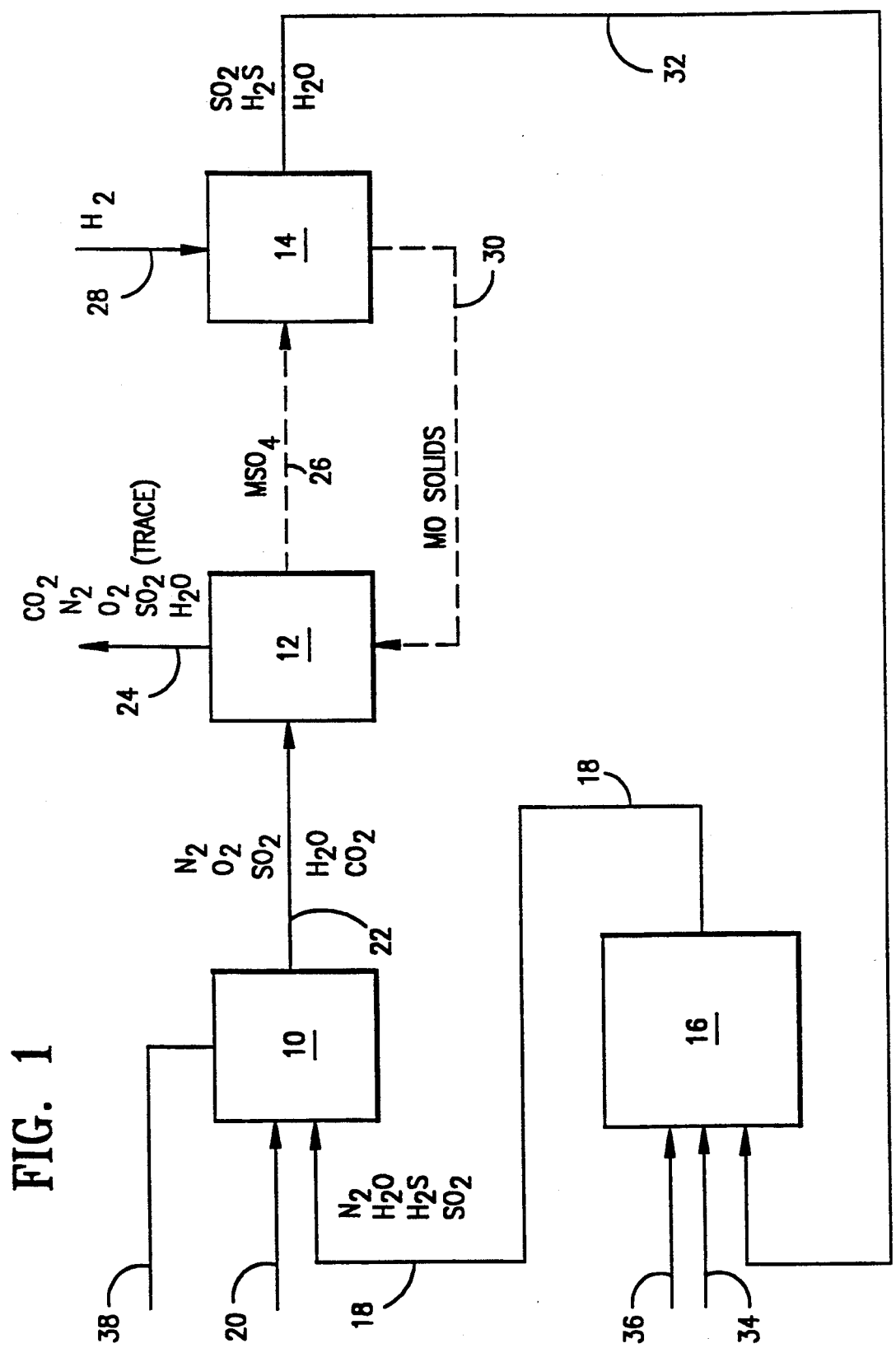
FIG. 1 is a schematic representation of a desulfurization process wherein a moving solid bed absorbent is utilized.

In the practice of this invention, referring to the FIG. 1, exhaust, or tail-gas from a Claus recovery process 16 is directed into an incinerator 10 via tail-gas conduit 18. This tail-gas is obtained from the Claus sulfur recovery process 16 by combining air via conduit 34 with an acid gas from acid gas conduit 36 into a Claus sulfur recovery process 16. A process for the reduction of the sulfur content in a gaseous stream wherein a Claus sulfur recovery process or unit is utilized is disclosed in U.S. Pat. No. 4,857,297 which issued to Kettner et al. on Aug. 15, 1989. This patent is hereby incorporated by reference herein. Tail-gas which enters incinerator 10 contains sulfur dioxide, hydrogen sulfide, water, and nitrogen plus minor amounts of COS, $NH_3$, nitrogen oxides, carbon monoxide, and carbon dioxide. Sulfur dioxide and hydrogen sulfide contained in the tail-gas is in a concentration too low to be removed by a Claus process. The concentration is also too high for emission into the atmosphere. Air is next directed into incinerator 10 via incinerator air conduit 20.

Incinerator 10 is operated at a temperature sufficient to convert the hydrogen sulfide gas into sulfur oxides. This temperature will be about 900° to about 1,350° F. The preferred temperature is about 1,200° F. After the oxidized tail-gas has been in incinerator 10 for a time sufficient to convert substantially all of the hydrogen sulfide to sulfur oxides, it is directed from incinerator 10 to absorber 12 via incinerator exit gas conduit 22. The gas which exits incinerator 22 contains water, sulfur oxides, oxygen, carbon dioxide, and nitrogen.

When gas exiting incinerator 10 enters absorber 12, it is contacted with the solid absorbent which absorbs substantially all of the sulfur oxides. The sulfur oxide-capturing absorbent can be in the form of balls, pebbles, spheres, extrudates, channeled monoliths, microspheres or pellets. This sulfur oxide-capturing absorbent provides absorbers or acceptors which absorb, and collect, or otherwise remove sulfur oxides from the influent gaseous stream. In the most preferred embodiment, the bed of granular material is a bed of sulfur-oxide capturing absorbents, which serve as sulfur oxide absorbers or acceptors. In the moving bed embodiment referred to in the drawing, solid absorbent is removed from absorber 12 by gravity. It moves by gravity since the absorbent is positioned in absorber 12 at an angle that causes it to move at a rate so as to allow maximum absorption of sulfur oxides. The flow rate of the solid absorbent through absorber 12 is such as to allow the absorption of about 10 to about 60 weight % of sulfur oxides on the absorbent, most preferably about 20 to about 60 weight %. Once sufficient sulfur oxides have been absorbed by the absorbent, it flows by gravity from absorber 12 via spent absorbent conduit 26 into regenerator 14. Gases, from which the sulfur has been substantially removed, are emitted from absorber 12 via absorbent exit gas conduit 24. The gas which is removed by conduit 24 contains water, traces of sulfur dioxide, oxygen and nitrogen. This emitted gas contains sulfur dioxide in an amount less than about 2 ppm. Nitrous oxides contained in this gas can be reduced by co-feeding ammonia or an ammonia-producing species such as urea into absorber 12.

Although a moving bed of absorbent may be used to remove the sulfur dioxide, it is preferred to contain the solid absorbent in a fixed bed. To accomplish this, a common vessel is used for both tail-gas absorption and also for absorbent regeneration. This is accomplished by appropriate valving so as to allow the flow of oxidized incinerator gas to the absorber to cease. Subsequently, the reducing gas is directed into the vessel and the regeneration stage is initiated. For continuity of operation, this is best accomplished by having two separate sets of vessels for both absorption and regeneration. As will be understood by those skilled in the art, when the absorbent is in a fixed bed embodiment, the atmosphere is merely swung from tail-gas (absorption) to reducing gas (regeneration) by appropriate valving. Greater specificity is obtained for the fixed bed method by reference to FIG. 2.

Figure 2:
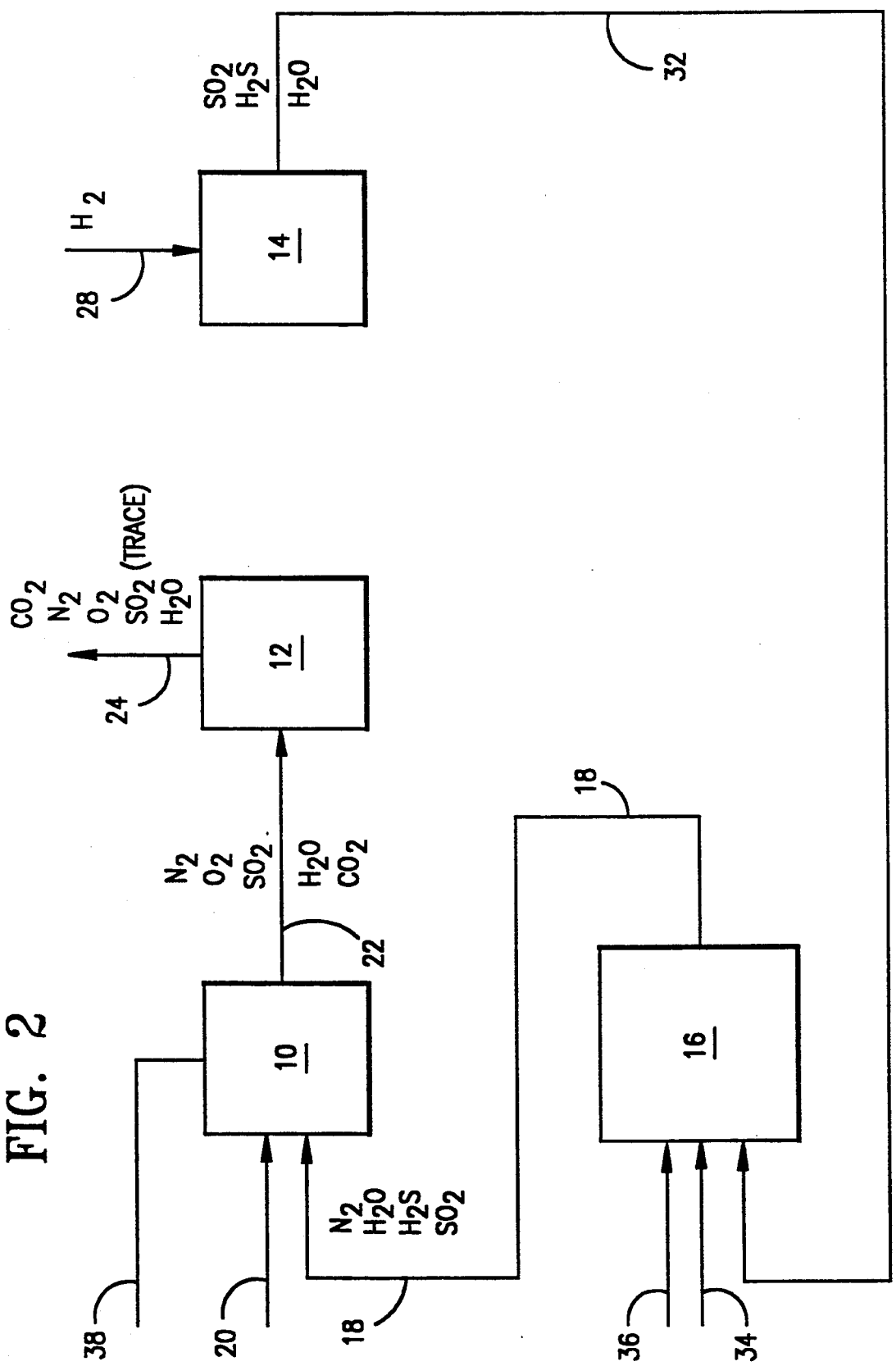
FIG. 2 is a schematic representation of a desulfurization process wherein a fixed solid bed absorbent is utilized.

As is shown in FIG. 2, the fixed bed method is similar to and follows the basic operating scheme as depicted in FIG. 1 which scheme is discussed above. The fixed bed method is better suited for those applications where less than about 4 psi of excess pressure drop is available. In most applications where the fuel gas is obtained from a Claus sulfur plant, the pressure drop will often be less than 4 psi. Although the fixed bed method is preferred for these applications, the fluidized bed is useful when sufficient driving pressure is available, because of is continuous operation capability and also because less hardware is required, i.e. fewer valves and pipes.

Referring now to FIG. 2, gas from incinerator 10 enters absorber 12 where it is contacted with the solid absorbent that absorbs substantially all of the sulfur oxides. The sulfur oxide-capturing absorbent, as mentioned above, can be in the form of balls, pebbles, spheres, pellets, extrudates, channel monoliths, or microspheres. These oxide-capturing absorbents absorb and collect, or otherwise remove substantially all of the sulfur oxides from the gases coming into absorber 12. Gases, from which sulfur oxides have been substantially removed, are emitted from absorber 12 via spent absorbent exit conduit 24. Those gases that exit absorber 12 via conduit 24 are monitored until sulfur oxide "break through" occurs. Sulfur dioxide concentration is monitored with an ultraviolet or infrared analyzer. Of course, as will be understood by those skilled in the art, other comparable analyzing equipment can be utilized.

Sulfur dioxide "break through" occurs when a substantial increase in the concentration of sulfur dioxide occurs in the effluent from absorber exit conduit 24. As anticipated, this increase will be from under 2 ppm to about 250 ppm in less than about 3 minutes.

When sulfur dioxide "break through" is detected, oxidized tail-gas from incinerator 10 is directed into a second vessel which then becomes absorber 12. In a preferred mode of operation, if sulfur dioxide breakthrough is detected during one absorption cycle, the duration of succeeding cycles is reduced by about 5% from the original absorption time, such that regeneration at the succeeding cycles is initiated before $SO_2$ breakthrough occurs. Original absorber 12 now containing the sulfur oxide loaded oxide-capturing absorbent is now transformed into regenerator 14 by closing off the tail-gas flow from incinerator 10 and directing hydrogen into the regenerator via hydrogen conduit 28. During the regeneration of the absorbent the temperature is maintained between about 900° to about 1,400° F., preferably about 1,100° to about 1,300° F. During the regeneration, a reducing gas, preferably hydrogen, is directed into regenerator 14 in about 0.10 to about 10 vol %, preferably about 2 to about 4 vol %. Pressure in the regenerator is maintained at about 0.10 to about 10 atmospheres, preferably about 0.5 to about 3 atmospheres. The gas hourly space velocity (GHSV) is about 10 to about 1,000, preferably 100 to about 150.

While the operating parameters for the regenerator are equally applicable to both the fluidized and the fixed bed processes, initially a GHSV of about 300 should be used when commencing regeneration of the fixed bed absorbent so that a higher concentration of liberated gases can be removed from the regenerator. As regeneration proceeds, the GHSV can be reduced to about 50 as the concentration of liberated gases diminishes. Similarly, although hydrogen is the preferred reducing gas, other hydrocarbon reducing gases can be used. These will preferably comprise $C_1$ through $C_5$ hydrocarbons. Substantially improved regeneration results are anticipated when water is co-fed into the regenerator along with the hydrocarbons. Once regeneration is completed, liberated sulfur dioxide, hydrogen sulfide, and water are removed from regenerator 14 via regenerator effluent conduit 32 and directed into Claus plant 16 for further treatment.

Whether operating under the fluidized or fixed bed method, it is preferred to operate absorber 12 at a temperature from about 900° to about 1,400° F. A temperature of from about 1,100° to about 1,300° F. is most preferred. Oxygen should be introduced into absorber 12 in an amount of from about 0.10 to about 10 vol %, 2 to about 4 vol % is preferred. Pressure within absorber 12 should be maintained at a pressure of from about 500 to about 20,000 GHSV, 3,000 to about 5,000 GHSV is preferred. An additional benefit of operating absorber 12 within these parameters is that any carbon monoxide therein is converted into carbon dioxide which is released into the environment. Other gases released from absorber 12 include nitrogen, oxygen, and trace amounts of sulfur dioxide along with water.

Operating conditions for incinerator 10 are similar when using either the fluidized or fixed bed method. Preferably, the temperature is maintained at from about 900° to about 1,400° F., most preferably between about 1,100° to about 1,300° F. Oxygen is introduced into the absorber in an amount of from about 0.1 to about 10 vol %, preferably 2 to about 4 vol %. Pressure in the absorber should be maintained at about 0.1 to about 10 atmospheres, preferably about 1.5 to about 3 atmospheres. The GHSV should be maintained at about 400 to about 7,000, preferably about 500 to about 2,500. In those situations where it is required fuel gas can be introduced into incinerator 12 via fuel gas conduit 38 as shown in FIG. 2.

Absorbents which can be utilized preferably comprise substantially alumina, and most preferably alumina compounded with magnesia, for best results. Gamma ($\gamma$) alumina, chi-eta-rho ($\chi$, $\eta$ $\rho$)alumina, delta ($\delta$) alumina, and theta ($\theta$) alumina are particularly useful as adsorbents and supports because of their high surface areas. The term "adsorbent" is used interchangeably herein with the term "absorbent." While alpha ($\alpha$) alumina and beta ($\beta$) alumina can be used as adsorbents, they are not as effective as gamma, chi-eta-rho, delta and theta alumina. One or more oxides of other metals can also be used as adsorbents, either alone or in combination with alumina or as spinels, such as bismuth, manganese, yttrium, antimony, tin, copper, Group 1a metals, Group 2a metals, rare earth metals, and combinations thereof. Magnesium aluminate spinels are particularly useful as adsorbers. Lanthanum and cerium are preferred rare earth metals. Naturally occurring rare earths, such as in the form of baestenite, are also useful adsorbers. Elemental copper or copper compound adsorbers, such as copper oxide adsorbers, can also be used. The copper oxide can be cuprous oxide ($Cu_2O$) and/or cupric oxide ($CuO$). Other copper compounds can be used, such as copper (II) sulfate, copper (II) acetate, copper (II) formate, copper (II) nitrate and/or copper (II) chloride. The adsorbers can also be a blend/mixture of high density and low density materials, such as of the above-identified metal oxides.

The metal or metal oxide part of the adsorbers can be supported, carried and held on a refractory support or carrier material which also provides part of the adsorbers. The support controls the attrition and surface area characteristics of the adsorbers. The support preferably has a surface area greater than about 10 $m^2/g$ and most preferably from about 50 $m^2/g$ to about 500 $m^2/g$ for best results. Suitable supporters include, but are not limited to, silica, alumina, kaolin or other clays, diatomaceous earth, boria, and/or mullite. The support can comprise the same material as the metal or metal oxide part of the adsorbers.

The adsorbers can be impregnated or otherwise coated with an oxidizing catalyst or promoter that promotes the removal of nitrogen oxides and the oxidation of $SO_2$ to $SO_3$ in the presence of oxygen. It is believed that $SO_3$ is more readily adsorbed than $SO_2$. One useful catalyst is ceria (cerium oxide). Another useful catalyst is platinum. Other catalytic metals, both free and in a combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver, and combinations thereof. The promoter can comprise the same material as the adsorber. An even distribution of the promoter is preferred for best results and to minimize adsorbent erosion.

The Group 1a metals, Group 2a metals, and Group 8 metals referred to are those listed in the Periodic Table of the Elements in the *Handbook of Chemistry and Physics* (54th Edition). Useful Group 1a metals include lithium, sodium, potassium, rubidium, and cesium. Useful Group 2a metals include magnesium, calcium, strontium, and barium. Useful Group 8 metals are the Group 8 noble metals (the platinum family of metals) including ruthenium, rhodium, palladium, osmium, iridium, and platinum. The rare earth metals are also useful and are referred to as the lanthanides. Suitable rare earth metals include cerium, praeseodymium, neodymium, samarium, europium, gadolinium, terbium, dysprosium, holmium, erbium, thulium, ytterbium, and lutetium.

The above-mentioned adsorbents are discussed in U.S. Pat. No. 4,692,318 which issued to Tolpin et al. on Sep. 8, 1987. This patent is hereby incorporated by reference herein. Although the adsorbents mentioned above are exemplary of the ones which can be used in the process to remove sulfur dioxide, the preferred absorbents are detailed in Example 1 through 4 below.

Spent absorbent from absorber 12 which has been directed into regenerator 14 is subjected to temperatures from about 900° to about 1,300° F. Also a hydrocarbon or hydrogen reducing gas is directed into regenerator 14 via hydrogen conduit 28. The conditions are such in the regenerator so as to cause substantially hydrogen sulfide and sulfur dioxide to be released from the solid absorbent as an off-gas. Regenerated solid absorbent is removed from regenerator 14 when operated in the moving bed mode via regenerated absorbent conduit 30. Conduit 30 directs the regenerated absorbent back into absorber 12. The solid absorbent can also be regenerated and reconstituted in the presence of water so as to further enhance its activity for the adsorption of sulfur oxides. Under the preferred conditions, sulfur is released from the adsorbent primarily in the form of sulfur dioxide in an amount of from about 80 to about 90 weight % during the regeneration or desorption step. Trace amounts of hydrogen sulfide also appear in the gases which are released from the absorbent doing regeneration or desorption. Off-gases which are emitted from the absorbent in regenerator 14 are removed therefrom via regenerator effluent conduit 32 where it proceeds into a Claus sulfur recovery process or plant 16 where elemental sulfur is recovered. Although the preferred embodiment has been discussed above and depicted in the drawings, other embodiments can be obtained that will be readily apparent to those skilled in the art.

In order to further demonstrate the working of this process, the following tests demonstrate the effectiveness of the method and the best mode known for operating the process.

EXAMPLE 1

A ceria/alumina sorbent was prepared by impregnating high pore value gamma alumina (⅛" extrudate from Dycat International) with a solution of 32.7 grams Ce(NO$_3$)$_6$.6H$_2$O from Aldrich Chemical Company in 45 grams of water, using an incipient wetness technique. The material was dried for three hours at 120° C. (248° F.) and calcined one hour at 700° C. (1,292° F.), in air. The composition was approximately 11% CeO$_2$/Al$_2$O$_3$. This material was crushed and sieved to 14/60 mesh (API).

EXAMPLE 2

A magnesium aluminate sorbent was prepared, starting with two solutions. Solution I contained 461.5 grams magnesium nitrate, 68.6 grams of concentrated nitric acid, and 500 mls of water. Solution II contained 209.7 grams sodium aluminate, 10.7 grams sodium hydroxide, and 500 mls of water. To Solution I were added 2 liters of water, and then over a 30 minute period, Solution II. Sodium hydroxide was then added in an amount to bring the pH up to 10.7. The resulting mixture was aged for 16 hours and then filtered. The recovered solids were dried at 170° C. (338° F.) for 12 hours and sized to 14/60 mesh (API). This material had a composition of about Mg$_2$Al$_2$O$_5$.

EXAMPLE 3

To make a sorbent with approximately 100 ppm platinum loading, 35 grams of the magnesium aluminate from Example 2 was impregnated using an incipient wetness technique with a solution of 0.013 gram of chloroplatinic acid (37% Pt. assay) in 16 mls of water. The resulting solids were calcined in air at 450° C. (810° F.) for three hours and sized to 14/60 mesh (API).

EXAMPLE 4

A sorbent with approximately 10% ceria loading on magnesium aluminate was prepared by adding a solution of 9.71 grams cerium nitrate in 16 mls of water to 35 grams of magnesium aluminate from Example 1, using an incipient wetness method. The material was then dried for three hours at 120° C. (248° F.), calcined in air one hour at 700° C. (1,292° F.), and sized to 14/60 mesh (API).

To test the sorbents' ability to sorb sulfur oxides from a gas mixture simulating an incinerated Claus tail-gas, 6 grams of each material described in Examples 1–4 were loaded in an 11 mm I.D. quartz reactor with a central thermowell. The reactor was placed in a radiant furnace for rapid heating and cooling. A gas flow of 360 cc/minute with a composition of 1% sulfur dioxide, 4% oxygen, and 95% nitrogen (on a dry basis) was established through the reactor, after the desired sorbtion temperature was attained. Water, in the amount of about 20% of the gas flow, as added by directing part of the feed gases through a saturator held at about 150° F.

The sulfur dioxide content in the effluent stream was monitored with a Siemens Ultramat 22P infrared analyzer. A cold trap between the reactor and the analyzer removed most of the water on the effluent stream. Sorption experiments were terminated when the sulfur dioxide level in the effluent exceeded 250 ppm. Sulfur dioxide breakthrough was relatively sharp. In general, the analyzer detected no sulfur dioxide for the first 80–90% of the sorption period. Sulfur dioxide concentration of less than 2 ppm during this portion of the sorption was confirmed by measurements with Drager gas measurement tubes. The calculated weight percentage uptake of sulfur oxide as SO$_3$ during the sorption period is reported in Table 1.

Regeneration of the solid sorbent was accomplished by contacting it with hydrogen, which was bubbled through a saturator to obtain about 25% water vapor content. The composition of the off-gas during reductive regeneration was determined by injections onto a Hewlett-Packard 5890 gas chromatograph equipped with a thermal conductivity detector. Usually, both hydrogen sulfide and sulfur dioxide could be detected in the off-gas, but typically one gas or the other dominated, depending on the sorbent and on operating conditions, as indicated in Table 1 below.

TABLE 1

| Sorbent Material Identity | Temperature of Sorption and Regeneration, °F. | Wt % Uptake During Sorption | Dominant Sulfur Compound In Regeneration Off-gas |
|---|---|---|---|
| CeO$_2$/Al$_2$O$_3$ (Ex. 1) | 1,000 | 4.8 | H$_2$S |
| CeO$_2$/Al$_2$O$_3$ | 1,200 | 6.2 | SO$_2$ |
| Mg$_2$Al$_2$O$_5$ (Ex. 2) | 1,200 | 4.7 | H$_2$S |
| Pt/Mg$_2$Al$_2$O$_5$ (Ex. 3) | 1,200 | 33.8 | SO$_2$ |
| CeO$_2$/Mg$_2$Al$_2$O$_5$ (Ex. 4) | 1,100 | 14.7 | H$_2$S |
| CeO$_2$/Mg$_2$Al$_2$O$_5$ | 1,200 | 25.2 | SO$_2$ |

The uptake of SO$_x$ was greater for Mg$_2$Al$_2$O$_5$ promoted with Pt (Ex. 3) and with CeO$_2$ (Ex. 4) was higher than for Mg$_2$Al$_2$O$_5$ alone (Ex. 2). For the ceria-promoted materials (Examples 1 and 4), magnesium aluminate was a more effective sorbent than alumina, and increasing the operating temperature from 1,000°–1,100° F. to 1,200° F. increased SO$_x$ sorption which shifted the dominant off-gas sulfur species from H$_2$S to SO$_2$.

EXAMPLE 5

The carbon monoxide oxidation activity of two sorbents was tested by flowing a mixture of 4% carbon monoxide, 4% oxygen, and 8% carbon dioxide at a flow rate of 310 cc/min over 6 grams of each material in an 11 mm I.D. quartz reactor. Carbon monoxide and carbon dioxide concentration, as a function of reactor temperature, were monitored by Beckman Model 864 infrared analyzers. With the magnesium aluminate of Example 2, carbon monoxide was half converted at about 770° F. and substantially all converted at 860° F. With the platinum-promoted magnesium aluminate of Example 3, carbon monoxide was half-converted at about 510° F. and substantially all converted at 540° F. With an empty reactor, there was no detectable carbon monoxide conversion for temperatures up to 1,200° F.

This example demonstrated that the designated sorbents are effective in promoting the removal of carbon monoxide in the presence of oxygen.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. In a process where a solid absorbent is used to remove sulfur oxides wherein said absorbent is regenerated with a reducing gas and off gas is passed to a Claus sulfur recovery process, the improvement comprising:

a) introducing an oxygen containing gas and a tail-gas into an incinerator under conditions sufficient to convert substantially all of the sulfur therein to sulfur oxides;

b) directing gas with sulfur oxides therein from the incinerator into an absorber operated so that substantially all of the sulfur oxides are absorbed on a solid absorber;

c) allowing sufficient time for a desired amount of sulfur oxides to be absorbed on said solid absorber;

d) ceasing absorption of sulfur oxides on said absorber;

e) regenerating the solid absorbent by contacting it with a hydrocarbon or hydrogen reducing gas under conditions sufficient to cause the absorbed sulfur oxides to be released, thereby forming a sulfur dioxide and hydrogen sulfide off gas and a regenerated solid absorbent whereby sulfur dioxide and hydrogen sulfide contained in the off gas is in an amount sufficient to be removed by a Claus sulfur recovery process; and f) directing the off gas into a Claus sulfur recovery process where this gas is converted to elemental sulfur.

2. The process as recited in claim 1 where in step b) said absorber is operated at a temperature of about 900° to about 1,400° F.

3. The process as recited in claim 1 where the solid absorbent is a metal oxide or mixture of oxides promoted with palladium or platinum metal.

4. The process as recited in claim 1 where in step e) the solid absorbent is reconstituted in the presence of water into a form which is active for further absorption of sulfur oxides.

5. The process as recited in claim 1 where in step c) sulfur oxides are absorbed on a fixed bed solid absorbent.

6. The process as recited in claim 1 where in step c) sulfur oxides are absorbed on a granulated moving bed solid absorbent.

7. The process as recited in claim 1 where in step c) said solid absorbent increases in weight from about 10 to about 60 wt. % due to absorbed sulfur oxides.

8. The process as recited in claim 1 where in step f) greater than 70 vol. % of sulfur in the off gas is sulfur dioxide.

9. The process as recited in claim 1 where in step b) greater than about 90 vol. % of carbon monoxide in the tail-gas is converted to carbon dioxide.

10. The process as recited in claim 1 where in step a) oxygen is introduced into the incinerator in an amount sufficient to maintain an oxygen content of about 0.10 to about 10 vol. % in gases issuing from the incinerator.

11. The process as recited in claim 1 which when combined with a Claus sulfur recovery process reduces sulfur oxide emissions to the atmosphere to about 2 ppm.

12. The process as recited in claim 1 where in step b) the pressure in said absorber is about 0.1 to about 10 atmospheres.

13. The process as recited in claim 1 where in step c) the absorber is operated at a gas hourly space velocity (GHSV) of about 2,000 to about 5,000, a pressure of about 1 to about 2 atmospheres, and a temperature of about 1,100° to about 1,350° F.

14. The process as recited in claim 1 where in step a) the incinerator is operated at a temperature of about 900° to about 1,350° F., a pressure of about 1 atmosphere, and a GHSV of about 2,000 to about 5,000.

15. The process as recited in claim 1 where in step c) said absorber is operated at a temperature of from about 900° to about 1,400° F., a pressure of about 1 to about 2 atmospheres, and a GHSV of about 500 to about 50,000.

16. A process where a solid absorbent is used to remove sulfur oxides wherein said absorbent is regenerated with a reducing gas and off gas is passed to a Claus sulfur recovery process comprising:

a) introducing an oxygen containing gas and a tail-gas containing sulfur compounds therein into an incinerator under conditions sufficient to convert substantially all of the sulfur to sulfur oxides;

b) directing gas with sulfur oxides therein from the incinerator into an absorber operated so that substantially all of the sulfur oxides are absorbed on a solid absorbent while a substantially sulfur oxide free gas is released from said absorber;

c) ceasing absorption of sulfur oxides on said absorbent after said absorbent has become substantially loaded with said oxides;

d) regenerating the solid absorbent by contacting it with a hydrocarbon or hydrogen reducing gas under conditions sufficient to cause the absorbed sulfur oxides to be released, thereby forming a sulfur dioxide and hydrogen sulfide off gas and a regenerated solid absorbent whereby sulfur dioxide and hydrogen sulfide contained in the off gas are in an amount sufficient to be removed by a Claus sulfur recovery process; and e) directing the off gas into a Claus sulfur recovery process where this gas is converted substantially to elemental sulfur.

17. The process as recited in claim 16 where in step b) said absorber is operated at a temperature of about 900° to about 1,400° F.

18. The process as recited in claim 16 where the solid absorbent is a metal oxide or mixture of oxides promoted with palladium or platinum metal.

19. The process as recited in claim 16 where in step d) the solid absorbent is reconstituted in the presence of water into a form which is active for further absorption of sulfur oxides.

20. The process as recited in claim 16 where in step b) sulfur oxides are absorbed on a fixed bed solid absorbent.

21. The process as recited in claim 16 where in step b) sulfur oxides are absorbed on a moving bed solid absorbent.

22. The process as recited in claim 16 where in step b) said solid absorbent increases in weight from about 10 to about 60 wt. % due to absorbed sulfur oxides.

23. The process as recited in claim 16 where in step e) greater than 70 vol. % of sulfur in the off gas is sulfur dioxide.

24. The process as recited in claim 16 where in step b) said gas contains carbon monoxide which about 90 vol. % thereof is converted to carbon dioxide prior to release from the absorber.

25. The process as recited in claim 16 which when combined with the Claus sulfur recovery process reduces sulfur oxide emissions in gas emitted from the absorber in step b) to less than about 2 ppm.

26. The process as recited in claim 16 where in step a) the incinerator is operated at a temperature of about 900° to about 1,350° F., a pressure of about 1 atmosphere, and a GHSV of about 2,000 to about 5,000.

27. The process as recited in claim 16 where in step b) said absorber is operated at a temperature of from about 900° to about 1,400° F., a pressure of about 1 to about 2 atmospheres, and a GHSV of about 500 to about 50,000.

28. A process where a solid catalytic absorbent is used to remove sulfur oxides wherein said absorbent is regenerated with a reducing gas and off gas is passed to a Claus sulfur recovery process comprising:
   a) introducing an oxygen containing gas and a tail-gas containing sulfur compounds into an incinerator under conditions sufficient to convert substantially all of the sulfur therein to sulfur oxides which gas when released from said absorber contains sulfur oxides of less that about 2 ppm;
   b) directing gas with sulfur oxides therein from the incinerator into an absorber operated so that substantially all of the sulfur oxides are absorbed on said solid catalytic absorbent while a resultant gas is released from the absorber which gas contains less than about 2 ppm of sulfur oxides;
   c) ceasing absorption of sulfur oxides on said absorbent after said absorbent has become substantially loaded with said oxides;
   d) regenerating the solid absorbent by contacting it with a hydrocarbon or hydrogen reducing gas under conditions sufficient to cause the absorbed sulfur oxides to be released, thereby forming an off gas of sulfur dioxide with a substantial proportion of hydrogen sulfide and a regenerated solid absorbent whereby sulfur dioxide and hydrogen sulfide contained in the off gas is in an amount sufficient to be removed by a Claus sulfur recovery process; and
   e) directing the off gas into a Claus sulfur recovery process where this gas is converted to elemental sulfur.

29. The process as recited in claim 28 where in step b) said absorber is operated at a temperature of about 1,100° to about 1,300° F., a gas hourly space velocity (GHSV) of about 2,000 to about 5,000, a pressure of about 0.5 to about 3 atmospheres, and oxygen in an amount of about 2 to about 5 vol % in the presence of a ceria/alumina absorbent.

30. The process as recited in claim 28 where the solid absorbent is a metal oxide or mixture of oxides promoted with palladium or platinum metal.

31. The process as recited in claim 28 where in step b) said absorbent is in the absorber in either a fluidized or fixed bed state.

* * * * *